Nov. 12, 1935.　　　E. MENDENHALL ET AL　　　2,020,512
APPARATUS FOR LOADING AND UNLOADING FLUID PACKED SEALS
Filed Oct. 26, 1931　　　2 Sheets-Sheet 2
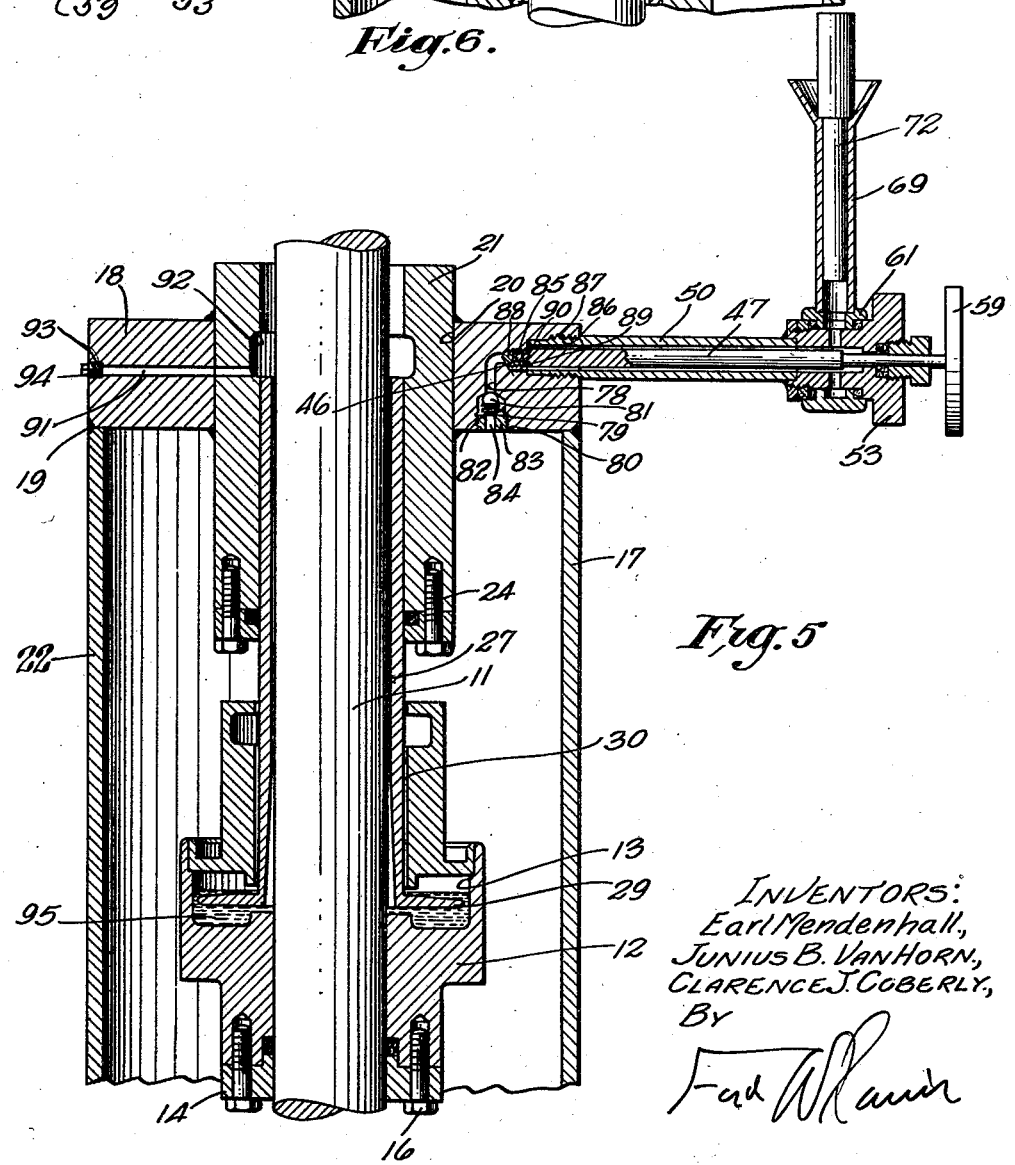

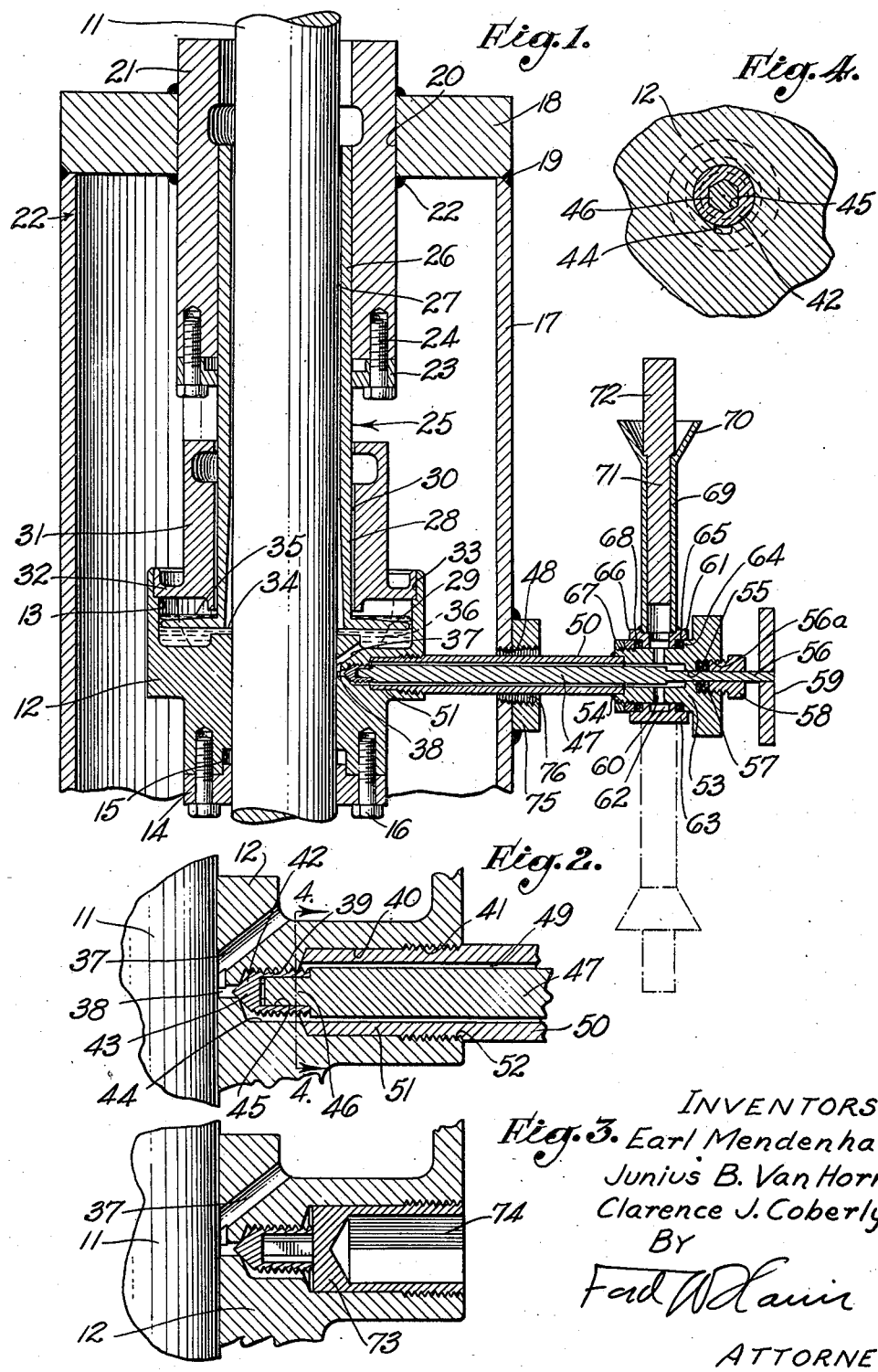

Patented Nov. 12, 1935

2,020,512

UNITED STATES PATENT OFFICE 2,020,512

APPARATUS FOR LOADING AND UNLOADING FLUID PACKED SEALS

Earl Mendenhall, Junius B. Van Horn, and Clarence J. Coberly, Los Angeles, Calif.; said Mendenhall and said Van Horn assignors to Menhorn, Inc., Los Angeles, Calif., a corporation of California Application October 26, 1931, Serial No. 571,154

23 Claims. (Cl. 286—9)

Our invention relates to a method of and apparatus for loading and unloading a fluid packed seal.

In the sealing of fluids from each other adjacent moving members it is frequently desirable to employ a fluid packed seal such as disclosed in co-pending application Serial No. 225,182, for Emulsion preventing seal. Because of the form of the seal members of the apparatus in which such a seal is employed, it is often extremely difficult to supply the sealing medium to the fluid packed seal.

It is an object of our invention to provide a device for filling such a seal.

In filling such a seal it is desirable, if the greatest sealing efficiency is to be obtained, that a definite, predetermined quantity of the sealing medium be provided to the seal.

It is a corresponding object of our invention to provide a method of and a device for filling a seal with a predetermined quantity of the sealing medium.

Because of the high cost of the sealing medium which may be employed, it is desirable that this sealing medium should all be removed when the seal is being drained.

It is another object of our invention, therefore, to provide a method of and a device for removing the sealing medium from such a seal.

More particularly, it is an object of our invention to provide a method of and device of the character described for filling the seal with and removing from the seal a predetermined quantity of sealing medium by exerting pressure upon the sealing medium.

It is still another object of our invention to provide a device of the character described which may be quickly associated with or disconnected from the apparatus and which operates to quickly and easily fill or empty the seal.

These and other objects will be made evident in the following description, which may be better understood with reference to the accompanying drawings, in which Fig. 1 is a sectional view illustrating the device of our invention.

Fig. 2 is a view of a fragmentary portion of Fig. 1.

Fig. 3 is a view of the same fragmentary portion of Fig. 1 with part of the device of our invention removed.

Fig. 4 is a sectional view taken as indicated by the line 4—4 of Fig. 2.

Fig. 5 is a sectional view illustrating an alternative embodiment of our invention.

Fig. 6 is a view similar to Fig. 5, illustrating a system utilizing two filling devices.

Referring to the drawings, which is for illustrative purposes only, the numeral 11 indicates a shaft adapted for rotation. The one end of the shaft 11 may if desired be attached to a source of power, such as an electric motor, and the other end of the shaft may if desired be attached to an operating mechanism such as a pump, and the entire unit is adapted to be placed in an inaccessible position, such as in the bottom of a well. Rotatably attached to the shaft 11 is a cylindrical wall member 12 provided in its upper end with a sealing chamber 13 concentric with the axis of the shaft 11. As illustrated in Fig. 1, the cylindrical wall member 12 may be secured to the shaft 11 by a collar 14 having a portion projecting into a cylindrical recess 15 of the cylindrical wall member 12 and secured to the wall member 12 by bolts 16.

Surrounding the cylindrical wall member 12 and concentric therewith is a cylindrical shell 17, to the upper end of which an inwardly extending annular collar 18 is secured as by welding 19. The collar 18 is provided with a central opening 20 in which a cylindrical sleeve 21 is disposed concentric with the axis of the shaft 11. The sleeve 21 may be attached to the annular collar 18 by welding, as indicated in Fig. 1, the cylindrical shell 17 thus cooperating with the collar 18 and the sleeve 21 in defining a shell 22. Positioned within the sleeve 21 and attached thereto by a collar 23 secured to the sleeve 21 by bolts 24, is an apron 25 which surrounds the shaft 11. The apron 25 comprises a cylindrical portion 26, the inner wall of which is spaced from the shaft 11 by an annular passage 27, and a diverging base portion 28 having on the lower end thereof a radial plate 29. The radial plate 29 is disposed in the sealing chamber 13 and is of a diameter slightly less than the diameter of the chamber 13.

Surrounding the apron 25 below the sleeve 21 and separated from this apron by an annular passage 30 is a cylindrical cover member 31 provided on its lower end with an outwardly projecting annular flange 32 defining the upper end of the sealing chamber 13. The annular flange 32 is of a diameter somewhat larger than the diameter of the sealing chamber 13 and is adapted to be received in a recess 33 formed in the upper end of the inner surface of the wall member 12. The cover member 31 is secured to the cylindrical wall member 12 in any suitable manner so that the cover member 31 and the cylindrical wall member 12 rotate with the shaft 11. Mercury or other high density sealing fluid is placed in the chamber 13 until the chamber is substantially half filled and the lower surface of the radial plate 29 is submerged, as shown in Fig. 1. It should be apparent that a first medium which may be in contact with the shaft 11 above the collar 18 is in communication through the passage 27 with the surface of the mercury between the diverging portion of the apron 25 and the shaft 11, this portion of the surface of the mercury being indicated by the numeral 34 of Fig. 1. Likewise, a second medium within the shell 22 is in communication through the annular passage 30 with the surface of the mercury between the diverging portion 28 of the apron 25 and the cylindrical wall member 12, this portion of the surface of the mercury being indicated by the numeral 35 of Fig. 1. The construction is such that the difference in the pressure exerted upon the surface portions 34 and 35 of the mercury by the first and second media is not sufficient to force the mercury out of the chamber 13 either upwardly through the passage 27 or upwardly through the passage 30. When the shaft 11 is rotated the cylindrical wall member 12 and the cover member 31 are likewise rotated so that by centrifugal force the mercury is thrown outwardly against the outer wall of the chamber 13, the surface of the mercury assuming the position indicated by the dotted lines 36 of Fig. 1. Inasmuch as the periphery of the radial plate 29 is always submerged in the mercury, it should be apparent that the first medium is prevented from coming in contact with the second medium and any tendency for an emulsion of the media is prevented.

In order to fill the chamber 13 with the exact amount of mercury desired, the cylindrical wall member 12 is provided with a declining passage 37 extending from the chamber 13 to the shaft 11. Also formed in the cylindrical wall member 12 is a horizontal passage 38 communicating with the inner end of the passage 37. The outer end of the horizontal passage 38 communicates with a cylindrical threaded bore 39 of larger diameter, which in turn communicates with a cylindrical opening 40 extending to the exterior of the wall member 12 and provided with threads 41 adjacent its outer end.

Disposed in the cylindrical bore 39 and in threaded engagement with the walls thereof, is a closure member in the form of a nut 42, the inner end 43 of which is conical so that when the nut 42 is advanced into the cylindrical bore 39, the conical end 43 projects into the horizontal passage 38 and engages a valve seat formed by the rim of this passage 38 with fluid-tight contact. In the lower portion of the cylindrical bore 39 a groove 44 is formed in the threads provided on the wall defining the cylindrical bore 39 and extending throughout the length of the bore 39. If the nut 42 be moved out of the cylindrical bore 39 until the conical end 43 is moved from engagement with the rim of the horizontal passage 38, communication is established between the declining passage 37 through the horizontal passage 38 and the groove 44 with the annular passage 49.

The outer end of the nut 42 is provided with a cavity 45, illustrated as hexagonal in form, which is adapted to receive a hexagonal end 46 of an actuating member 47. As illustrated in Fig. 1, the actuating member 47 extends outwardly through an opening 48 in the cylindrical shell 17. Surrounding the actuating member 47 and separated therefrom by an annular passage 49, is a conveying member in the form of a cylindrical sleeve 50. The inner end of the cylindrical sleeve 50 is provided with a portion 51 of a reduced external diameter and with threads 52 upon this reduced portion for engagement with the threads 41 of the cylindrical opening 40 so that the cylindrical sleeve 50 may be brought into engagement with the bottom wall of the opening 40 as shown. The outer end of the cylindrical sleeve 50 is secured to a head member 53 as by welding, indicated by the numeral 54 of Fig. 1. The head member 53 is provided with a cylindrical opening 55 concentric with the axis of the actuating member 47 through which a reduced end 56 of the actuating member 47 is adapted to pass. Formed in the outer surface of the head member 53 and communicating with the cylindrical opening 55 is a packing chamber 56a in which a packing 57 is retained around the reduced portion 56 of the actuating member 47 by a nut 58. The reduced portion 56 of the actuating member 47 extends beyond the nut 58 and is provided at its end with a hand wheel 59 to facilitate the rotation of the actuating member 47.

Likewise formed through the head member 53 is a vertical passage 60 which communicates with the passage 49 surrounding the actuating member 47. Rotatably mounted upon the head member 53 is a collar 61 provided with an internal annular groove 62 communicating with both extremities of the vertical passage 60. The collar 61 is provided with an annular shoulder 63 in slidable contact with a projecting shoulder 64 of the head member 53. Disposed between the annular shoulder 63 of the collar 61 and the projecting shoulder 64 of the head member 53 is a packing ring 65. The collar 61 is provided with a second annular shoulder 66 formed on its other side and adapted for sliding engagement with a locking nut 67 threaded upon the head member 53 adjacent the cylindrical sleeve 50. Disposed between the locking nut 67 and the annular shoulder 66 of the collar 61 is a second packing ring 68. The packing rings 65 and 68 operate to render fluid-tight the engagement between the collar 61 and the head member 53.

Attached to the collar 61, as by welding, is an indicating means in the form of a cylinder 69 having an outwardly flared end 70. Slidably disposed in the cylinder 69 is a reduced end 71 of an operating member or plunger 72.

The operation of our invention is as follows:

The nut 42 is advanced in the cylindrical bore 39 so that its conical end 43 shuts off communication between the horizontal passage 38 and the groove 44, and the filling device of our invention is attached to the cylindrical wall member 12 by threading the cylindrical sleeve 50 into the cylindrical opening 40, as illustrated in Fig. 1. It should be noted that the actuating member 47 may turn relative to the cylindrical sleeve 50 so that the cylindrical sleeve may be threaded into the cylindrical opening 40 with the hexagonal end 46 of the actuating member 47 contacting the nut 42. When the cylindrical sleeve 50 is secured to the cylindrical wall member 12, as illustrated in Fig. 1, the actuating member 47 is pushed inwardly until its hexagonal end 46 is disposed in the hexagonal cavity 45 of the nut 42. The plunger 72 is then removed from the cylinder 69 and a predetermined quantity of mercury is poured into the cylinder 69 and the plunger 72 is replaced in the cylinder 69 with its lower end engaging the upper surface of the mercury therein contained. If now the hand wheel 59 be actuated to rotate the actuating member 47, the nut 42 may be moved from engagement with the rim of the horizontal passage 38 a sufficient distance so that communication is established between the annular passage 49 through the groove 44, the horizontal passage 38, and the declining passage 37 with the chamber 13. The plunger 72 is now pushed downwardly, forcing the mercury from the cylinder 69 through the annular groove 62 and the vertical passage 60 into the annular passage 49 and through the path just described into the chamber 13. It should be apparent that the volume of the annular passage 49, the vertical passages 60, the annular groove 62, and the portion of the cylinder 69 below the end of the plunger 72 may be readily calculated so that the exact amount of mercury necessary to provide a predetermined quantity of mercury to the chamber 13 may be supplied to the cylinder 69. Moreover, the position of the plunger 72 relative to the cylinder 69 indicates the quantity of mercury which has been forced into the chamber 13 at any time during its actuation.

When the desired quantity of mercury has been supplied to the chamber 13, the hand wheel 59 is again actuated so that the nut 42 is moved into the cylindrical bore 39 until its conical end 43 shuts off communication between the horizontal passage 38 and the groove 44. The actuating member 47 is then moved rearwardly until its hexagonal end is out of engagement with the nut 42. The cylindrical sleeve 50 is now unscrewed from the cylindrical wall member 12 and it is removed from the apparatus. If it is desired, a lock nut 73 may then be threaded into the cylindrical opening 40 against the outer end of the nut 42 to retain it in its proper position, as illustrated in Fig. 3. The locking nut 73 may likewise be provided with a hexagonal cavity 74 adapted for the reception of the hexagonal end of a tool for the insertion or removal of the locking nut 73.

After the removal of the cylindrical sleeve 50 from the cylindrical wall member 12 and the cylindrical shell 17, a plug (not shown) may be threaded into the opening 48. As illustrated in Fig. 1, a nut 75 may be welded to the outer surface of the cylindrical shell 17 around the opening 48 to provide additional threads 76 for the reception of this plug.

When it is desired to remove the mercury from the chamber 13 the plug is removed from the opening 48 of the cylindrical shell 17 and the cylindrical wall member 12 is rotated until the cylindrical opening 40 is in alignment with the opening 48 of the cylindrical shell 17. Any suitable tool with a hexagonal end is inserted into the locking nut 73 and the locking nut 73 is thus removed from the wall member 12. The actuating member 47, being in its retracted position in the cylindrical sleeve 50, the sleeve 50 is threaded into the cylindrical opening 40 of the wall member 12. The actuating member 47 is now projected from the cylindrical sleeve 50 so that its hexagonal end 46 is moved into the cavity 45 of the nut 42 and by the manipulation of the hand wheel 59, the nut 42 is moved a slight distance out of the cylindrical bore 39. The plunger 72 being in the position illustrated in Fig. 1, the collar 61 is rotated through 180° so that the cylinder 69 and the plunger 72 occupy the position illustrated by the dotted lines of Fig. 1. If now the plunger 72 is moved out of the cylinder 69, a partial vacuum is created within the passage 49 and the groove 44 which serves to draw the mercury from the chamber 13 through the declining passage 37, the horizontal passage 38, the groove 44, and the annular passage 49 into the cylinder 69. It should be apparent that the presence of the annular flange 29 in the chamber 13 presents no obstacle to the removal of the mercury from the chamber 13 by the operation of the plunger 72 in the manner just described. In some instances the use of the plunger 72 in draining the seal is unnecessary, the sealing liquid draining by gravity through the passages and from the inverted cylinder 69.

In Fig. 5 there is illustrated an alternative form of our invention with like numbers indicating those elements which are identical with the construction previously described. This embodiment of our invention differs from that form previously described in that there is no provision for the introduction of the sealing medium directly into the chamber 13 through the cylindrical wall member 12. The annular collar 18 of this embodiment of our invention is likewise of different construction, being provided with a passage 78 which extends from the outer cylindrical surface of the annular collar 18 inwardly and downwardly to the lower horizontal surface thereof. As illustrated in Fig. 5, the lower end of the passage 78 is provided with an enlarged portion 79 having threads 80 formed in the walls at its lower end. Disposed in the enlarged portion 79 is a valve of any suitable construction for preventing the passage of second medium from the interior of the shell 22 through the passage 78 when the pressure on the interior of the shell 22 exceeds that on the exterior thereof. In the drawings, this valve is illustrated as comprising a ball 81 which is normally urged into contact with the walls defining the upper end of the enlarged portion 79 by a compression spring 82, the lower end of which engages a nut 83 in threaded engagement with the threads 80. The nut 83 is provided with a central cylindrical opening 84 through which the enlarged portion 79 of the passage 78 communicates with the interior of the shell 22. The passage 78 terminates at its upper end in an intermediate threaded cavity 85 of larger diameter than the passage 78, and the intermediate cavity 85 communicates with a chamber 86 which, in turn, communicates with the exterior of the annular collar 18. The chamber 86 is provided with threads 87 in its walls adjacent its outer end, so that the intermediate chamber 85 and the chamber 86 are identical with the cylindrical bore 39 and the cylindrical opening 40 of the embodiment previously described.

Disposed in the intermediate cavity 85 and in threaded engagement with the walls thereof, is a closure member 88, the inner end of which is conical so that when the closure member 88 is advanced into the cavity 85 the conical end projects into the passage 78 and engages the walls thereof with fluid-tight contact. A groove 89 is formed in the threads provided on the walls defining the intermediate cavity 85 and extends throughout the length of the intermediate cavity 85, so that when the closure member 88 is moved out of contact with the walls of the passage 78, communication is established between the passage 78 and the cavity 86. The closure member 88 is provided with a cavity 90 adapted for the reception of the hexagonal end 46 of the actuating member 47. The actuating member 47, the conveying member 50, the head member 53, the collar 61, and the cylinder 69 having been previously described, it is thought that a detailed description of their construction is here unnecessary.

Also formed in the annular collar 18 is a second channel or passage 91 which extends substantially horizontal from the outer cylindrical surface of the annular collar 18, through the collar 18 and the cylindrical sleeve 21 into communication with an annular cavity 92 formed in the inner surface of the cylindrical sleeve 21. At its outer end the second channel 91 is provided with an enlarged threaded portion 93 adapted for the reception of a threaded plug 94.

The operation of this embodiment of our invention is as follows:

The shell 22 being filled with the second medium, and the chamber 13 containing a body 95 of sealing medium, such as mercury, when it is desired to remove the mercury from the sealing chamber 13, the cylindrical sleeve 50 is threaded into the cavity 86, and the actuating member 47 is moved inward until its inner end 46 is disposed in the cavity 90 formed in the closure member 88. The hand wheel 59 is then rotated until the closure member 88 is moved out of the intermediate cavity 85 so that communication is established between the passage 78 and the cavity 86. The cylinder 69 being filled with a fluid, the plunger 72 is moved downward, thus exerting a fluid pressure upon the second medium in the shell 22. This fluid pressure is exerted through the annular passage 30 upon the surface of the mercury 95 above the radial plate 29, thus forcing the mercury upwardly in the annular passage 27 around the shaft 11. The fluid pressure exerted upon the second medium in the shell 22 is increased by the continued downward movement of the plunger 72 until the mercury is forced into the annular cavity 92 and through the second channel 91, and being discharged therefrom it is received in a suitable receptacle, not shown. It should be obvious that the pressure upon the second medium in the shell 22 may be increased to any extent desired by the reciprocation of the plunger 72 in the cylinder 69, inasmuch as during the upstroke of the plunger 72 fluid under pressure is prevented from escaping from the interior of the shell 22 through the passage 78 by the ball valve 81.

When it is desired to fill the chamber 13 with a sealing medium, a sealing medium such as mercury is introduced through the second channel 91 to the annular passage 27 around the shaft 11, and from this annular passage the mercury flows by gravity to the chamber 13. Although we have illustrated the second passage 91 as being substantially horizontal, it may be declined toward the shaft 11 to facilitate the filling of the chamber 13 with the sealing medium, or it may be inclined toward the shaft 11 to facilitate the conveying of the mercury from the annular cavity 92 during the emptying operation. If the second passage 91 is inclined toward the shaft 11, or is horizontal as it is illustrated, it may be desirable to provide at the outer terminus of the second passage 91 threaded cavities similar to the intermediate cavity 85 and the cavity 86 for the reception of the cylindrical sleeve 50 and its associated mechanism. By forming the second passage 91 with these cavities and connecting the cylindrical sleeve 50 and its associated mechanism with the annular collar 18 so that it communicates with the second passage 91, it is thus possible to exert pressure upon the sealing medium, forcing it through the second passage 91 and thus into the sealing chamber 13. Such a construction is illustrated in Fig. 6.

At all times except during the emptying and filling operations, the threaded plug 94 is disposed in the outer end of the second channel 91, thus shutting off communication between the annular passage 27 and the exterior of the shell 22. Likewise when the cylindrical sleeve 50 and its associated mechanism are not being employed during the filling operation, they may be removed from the annular collar 18, and a lock nut (not shown), of a construction similar to the lock nut 73 illustrated in Fig. 3, may be threaded into the cavity 86 to secure the closure member 88 in position closing the passage 78.

It is obvious that by the apparatus of our invention a predetermined quantity of the sealing fluid may be supplied to and removed from the sealing chamber. The position of the plunger 72 in the cylinder 69 indicates the quantity of sealing medium which has been supplied to or removed from the sealing chamber, and it will be clear that with atmospheric pressure in the shell 22 the level of the sealing fluid in the cylinder 69 indicates the level of this sealing fluid in the sealing chamber. Inasmuch as the sealing fluid is forced into the sealing chamber by the exertion of pressure upon the fluid by the plunger 72, and inasmuch as the fluid is removed from the sealing chamber by the pressure exerted upon the surface of the sealing fluid in the sealing chamber, it should be apparent that the apparatus of our invention accomplishes the purpose primarily stated of filling and removing from the sealing chamber a predetermined quantity of the sealing medium by exerting pressure upon the sealing medium.

From the description of the attachment to and the disconnection from the walls of the sealing chamber of the apparatus of our invention, it may be seen that the device of our invention may be very quickly associated with or disconnected from the apparatus.

While that embodiment of our invention hereinbefore illustrated and described is fully capable of performing all of the objects and providing all of the advantages primarily stated, there are various other forms of our invention likewise capable of performing these objects and providing these advantages, and we therefore wish our invention to be understood as not restricted to that embodiment hereinbefore described.

We claim as our invention:

1. In combination: a rotatable shaft; a cup means connected to said rotatable shaft and co-operating therewith in defining a rotatable member providing a sealing chamber containing a sealing liquid; a stationary apron extending downward around said shaft and into said sealing liquid; walls defining a passage through said rotatable member and communicating with the lower portion of said sealing chamber whereby sealing liquid may be moved into and from said sealing chamber through said passage and a removable closure member for closing said passage.

2. In a device for filling a sealing chamber of a fluid packed seal with and emptying said chamber of a sealing liquid, the combination of: walls forming a passage communicating with said chamber; a closure member adapted for adjustment to open and close said passage; an actuating member disposed in said passage and adapted for association with said closure member to adjust said closure member, said actuating member being of smaller size than said passage to define a liquid-conducting space therebetween; a cylinder communicating with said passage; and an operating member associated with said cylinder and adapted for exerting pressure upon liquid in said passage to move sealing liquid through said liquid-conducting space and thence into said sealing chamber.

3. In combination in a fluid-packed seal for sealing a vertical rotatable member with respect to a stationary member; walls refining an annular chamber around said rotatable member and adapted to contain a body of sealing liquid; an apron extending downward around said rotatable member to a point beneath the surface of said body of sealing liquid; walls defining a passage communicating with said annular chamber; walls definining an outlet for said sealing liquid and communicating with said sealing liquid at a point beneath said surface and extending upward to a point above said chamber; and means for increasing the pressure in said passage to force said sealing liquid upward in said outlet and from said chamber.

4. In combination in a fluid-packed seal for sealing a vertical rotatable member with respect to a stationary member: walls defining an annular chamber around said rotatable member and adapted to contain a body of sealing liquid; an apron extending downward around said rotatable member to a point beneath the surface of said body of sealing liquid; walls defining a passage communicating with said annular chamber; walls defining an outlet for said sealing liquid and communicating with said sealing liquid at a point beneath said surface and extending upward to a point above said chamber; a check valve in said passage; and manually controlled means removably associated with said walls for forcing fluid under pressure through said passage and said check valve to cause said sealing liquid to rise in said outlet and flow from said chamber.

5. In combination: a shaft; walls defining a sealing chamber around said shaft; an apron extending into said sealing chamber; a shell surrounding said walls and said shaft; walls forming a passage means opening on the lower end of said sealing chamber and extending to a point outside said shell; and means for supplying sealing liquid to and conducting sealing liquid from said sealing chamber through said passage means.

6. In combination: a shaft; walls defining a sealing chamber around said shaft; an apron extending into said sealing chamber; a shell surrounding said walls and said shaft; walls defining a passage means communicating with said sealing chamber and extending to a point exterior of said shell; means exterior of said shell for retaining a body of sealing liquid, said means communicating with said passage means; and means for moving said sealing liquid from said last-named means into said sealing chamber.

7. In combination: a rotatable shaft; walls rotating with said shaft, and defining a sealing chamber around said shaft; an apron extending into said sealing chamber; walls defining a passage means communicating with the lower end of said sealing chamber; and means detachably connected to said walls defining said passage means for supplying sealing liquid to said passage means under sufficient pressure to cause said sealing liquid to enter said sealing chamber and rise therein until the lower portion of said apron is covered.

8. In combination: a rotatable member defining a sealing chamber containing a sealing liquid; an apron extending into said sealing chamber and into said sealing liquid therein; a passage through a portion of said rotatable member and communicating with said sealing liquid in said sealing chamber; valve means rotating with said rotatable member for closing said passage; liquid-conducting means detachably connected to said rotatable member and communicating with said passage when said valve means is opened; and means for operating said valve means when said liquid-conducting means is connected to said rotatable member.

9. In combination: a member defining a sealing chamber containing a sealing liquid; an apron extending into said sealing chamber and into said sealing liquid; a passage means formed through said member and communicating with the lower end of said sealing chamber; and conveying means forming an upward extending chamber communicating with said passage means and containing sealing liquid, said upward extending chamber and said sealing chamber thus forming legs of a U-shaped space whereby the sealing liquid in said sealing chamber and in said upward extending chamber seek a common level thereby indicating the level of said sealing liquid in said sealing chamber.

10. In combination: a rotatable shaft; walls rotating with said shaft and defining a sealing chamber around said shaft, said walls and said shaft defining a rotatable member; a stationary apron extending into said sealing chamber; walls forming a passage through said rotatable member and communicating with said chamber; a valve means for said passage; a conveying member removably associated with said walls and comprising a sleeve the interior of which communicates with said passage through said valve means; an actuating member extending in said sleeve and positioned to engage said valve means to control the opening and closing thereof; and means for supplying sealing liquid to said sleeve, said sealing liquid flowing into said sealing chamber when said valve means is opened by said actuating member.

11. In combination: a shaft; walls defining a sealing chamber around said shaft; an apron extending into said sealing chamber; walls forming a passage communicating with said chamber; a conveying member removably associated with said walls forming said passage and communicating with said passage; and a cylinder pivotally mounted on said conveying member and communicating therethrough with said passage, said cylinder when in upright position retaining a body of sealing liquid which can move into said sealing chamber; said cylinder when pivoted into a downward extending position draining said sealing liquid from said sealing chamber.

12. A combination as defined in claim 11 including a valve means controlling the flow of said sealing liquid through said passage, and including means operable from the exterior of said conveying member for controlling said valve means during the time that said conveying member is connected to said walls forming said passage.

13. In combination: a shell; a rotatable shaft extending from said shell; a rotatable cup means secured to said shaft in said shell and providing a sealing chamber containing a sealing liquid, said shaft and said cup means defining a rotatable member; walls defining a passage through a portion of said rotatable member and communicating with said sealing chamber, said walls including a threaded bore on which said passage opens to define a valve seat; a closure member threaded into said threaded bore and normally seating against said valve seat to close said passage; walls defining a groove traversing the threads of said threaded bore and communicating at one end with said valve seat and at the other end with the outer portion of said threaded bore whereby a slight unscrewing of said closure member permits a stream of sealing liquid to flow through said groove without necessitating removal of said closure member from said bore; a conveying member extending through said shell and detachably connected to said rotatable member to communicate with said threaded bore to conduct the sealing liquid moving through said groove; and means associated with said conveying member and operatively connected to said closure member while said conveying member and said rotatable member are connected together for moving said closure means to permit open communication between said conveying member and said passage whereby sealing liquid may flow therethrough.

14. In combination: a shell; a rotatable shaft extending from said shell; a rotatable cup means secured to said shaft and providing a sealing chamber containing a sealing liquid, said shaft and said cup means defining a rotatable member; a stationary apron extending into said sealing liquid; walls defining an opening in said rotatable member and communicating with said sealing chamber, there being an opening through said shell substantially opposite said opening of said rotatable member; a conveying member removably extending through said opening in said shell and into communication with said opening in said rotatable member to communicate with said sealing chamber; and valve means controlling the flow of sealing liquid through said conveying member.

15. In combination: a shell; a rotatable shaft extending from said shell; a rotatable cup means secured to said shaft and providing a sealing chamber containing a sealing liquid, said shaft and said cup means defining a rotatable member, said rotatable member including a passage communicating with said sealing chamber; a stationary apron extending into said sealing liquid; and means detachably connected to said rotatable member for delivering sealing liquid to said sealing chamber through said passage from a position outside said shell.

16. In combination: a member defining a sealing chamber containing a sealing liquid; an apron extending into said sealing chamber and into said sealing liquid; a passage means formed through said member and communicating with the lower end of said sealing chamber; walls forming an upward extending chamber communicating with said passage means and containing sealing liquid, said upward extending chamber and said sealing chamber thus forming legs of a U-shaped space whereby the sealing liquid in said sealing chamber and in said upward extending chamber seek a common level thereby indicating the level of said sealing liquid in said sealing chamber; and means for relatively changing the pressures acting on said sealing liquid in said sealing chamber and in said upward extending chamber to force said sealing liquid from one leg of said U-shaped space to the other through said passage means.

17. A combination as defined in claim 16 in which said last-named means includes a piston means movable in said upward extending chamber to move the surface of the sealing liquid therein thereby moving sealing liquid through said passage means.

18. In combination: a shell; a rotatable shaft extending from said shell; a rotatable cup means secured to said shaft in said shell and providing a sealing chamber containing a sealing liquid, said shaft and said cup means defining a rotatable member, said rotatable member including a passage communicating with said sealing chamber; a stationary apron extending into said sealing liquid; closure means normally closing said passage; a conveying member extending through said shell and removably connected to said rotatable member to communicate with said passage; and means associated with said conveying member and operatively connected to said closure member while said conveying member and said rotatable member are connected together for moving said closure means to permit open communication between said conveying member and said passage whereby sealing liquid may flow therethrough.

19. In combination: a rotatable shaft; cup means secured to said shaft and defining a sealing chamber containing a sealing liquid; an apron around but spaced from said shaft to define an annular space therebetween, said apron extending into said body of sealing liquid; walls defining a passage communicating with said annular space between said shaft and said apron; closure means for said passage; and liquid-conducting means detachably connected to said passage for conducting sealing liquid flowing through said annular space.

20. In combination: walls defining a sealing chamber containing a body of sealing liquid; an apron extending into said body of sealing liquid to divide the surface thereof into two separated portions; walls forming a passage communicating with one of said portions and extending upward to a point above said sealing chamber; and pump means for changing the pressure on one of said portions with respect to the other to force said sealing liquid upward in said passage and thus from said sealing chamber.

21. In combination: a shaft; walls defining a sealing chamber around said shaft and adapted to receive a sealing liquid; an apron extending into said sealing chamber; and movable walls forming a passage communicating with said sealing chamber at a given section, said walls being capable of movement from a first position in which the outer end of said passage lies above said given section to a second position in which the outer end of said passage lies below said given section whereby when said walls are in said first position sealing liquid may flow from said passage into said sealing chamber and when said walls are in said second position sealing liquid may drain from said sealing chamber through said passage.

22. In combination: a vertically disposed rotatable shaft; cup means defining a sealing chamber around said shaft and adapted to contain a body of sealing liquid; an apron extending downward around said shaft and into said sealing liquid to divide the surface thereof into two portions; walls forming a passage through said cup means communicating with the lower part of said sealing chamber whereby said sealing liquid can flow to and from said sealing chamber when said passage is open; means for supplying sealing liquid to said passage under sufficient pressure to force said sealing liquid upward in said sealing chamber until the surface thereof is above the lowermost end of said apron; and closure means for closing said passage to prevent escape of said sealing liquid from said sealing chamber, said passage communicating with the lower part of said sealing chamber to permit said sealing liquid to flow from said sealing chamber through said passage when said closure means does not close said passage.

23. In combination: a vertical rotatable shaft; cup means defining a sealing chamber around said shaft and adapted to receive a sealing liquid; a shell around said shaft; an apron fixed with respect to said shell and extending downward around said shaft, at least a portion of said apron being spaced from said shaft to define an annular space therebetween, said apron extending into said sealing chamber; and means for supplying sealing liquid to said annular space, said sealing liquid moving through said annular space and into said sealing chamber to fill said sealing chamber to a point above the lower end of said apron, said means including a passage formed through said shell and communicating with said annular space.

EARL MENDENHALL.
JUNIUS B. VAN HORN.
CLARENCE J. COBERLY.